United States Patent [19]

Owens

[11] 4,122,334
[45] Oct. 24, 1978

[54] ILLUMINATION CONTROL APPARATUS FOR COMPENSATING SOLAR LIGHT

[75] Inventor: Lester J. Owens, Titusville, Fla.

[73] Assignee: The United States of America as represented by the Administrator of the National Aeronautics and Space Administration, Washington, D.C.

[21] Appl. No.: 753,977

[22] Filed: Dec. 23, 1976

[51] Int. Cl.² .................... H01J 39/12; H05B 37/02
[52] U.S. Cl. .................... 250/214 R; 200/61; 200/46; 200/201; 200/220; 250/214 AL; 315/153
[58] Field of Search ........ 250/214 AL, 214 R, 214 B; 200/33 A, 61, 46, 189, 201, 220, 221; 315/153, 154

[56] References Cited

U.S. PATENT DOCUMENTS

| | | | |
|---|---|---|---|
| 3,350,581 | 10/1967 | Stein, Jr. | 250/214 AL X |
| 3,961,183 | 6/1976 | Dubot et al. | 250/214 AL |

FOREIGN PATENT DOCUMENTS

| | | | |
|---|---|---|---|
| 2,425,721 | 12/1975 | Fed. Rep. of Germany | 315/153 |
| 663,456 | 8/1929 | France | 200/220 |

*Primary Examiner*—Lawrence J. Dahl
*Attorney, Agent, or Firm*—James O. Harrell; John R. Manning

[57] ABSTRACT

Illumination control apparatus for supplementing light from solar radiation with light from an artificial light source to compensate for periods of insufficient levels of solar light to maintain a desired illumination level within an interior space comprising an artificial light source connected to an electrical power source with switch means for selectively energizing said light source, actuator means for controlling the on-off operation of the switch means, a light sensor connected to the actuator means for controlling the actuator means in response to the illumination level of the interior space, and a limit switch carried adjacent the actuator for limiting the movement of the actuator within a predetermined range so as to prevent further movement thereof during detection of erroneous illumination conditions.

11 Claims, 6 Drawing Figures

ILLUMINATION CONTROL APPARATUS FOR COMPENSATING SOLAR LIGHT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The possibility of future electrical energy shortages requires that considerable attention be given to conservation measures. As electricity for lighting is almost universally used, conservation of electricity in this area could result in considerable savings of energy.

Parallel uses of glass and higher levels of artificial illumination have been modern trends by architects. However, effective utilization of natural light played little or no part in the design of building illumination systems.

Most modern buildings have the lighting zones broken down so one switch controls a 1,000 to 1,600 watts of lighting fixtures on a 110 volt 60 cycle electrical supply. A zone can be broken into sub-loops. If the sub-loop fixtures are properly oriented within a zone, perhaps an office, natural outside light can serve as a base and artificial light can be supplemented as needed to maintain a desired level of illumination as solar light varies. However, to be effective, such a lighting system must have an automatic control for blending the natural and artifical light.

Prior light control systems have been developed such as that shown in U.S. Pat. No. 1,944,751 wherein a relay controlled by a photo-sensor device adds or removes impedance of associated lighting units so that the lighting units are always operated at their rated power values. While such a system detects the illumination level in a room, such a system lacks the sophistication required for continuous blending of interior artificial light with natural light from the sun in an efficient manner. Likewise, such a system does not provide for detecting erroneous illumination levels such as when light bulbs are burned out and sufficient lighting to maintain the desired illumination level is not available.

SUMMARY OF THE INVENTION

The present invention relates to an illumination control apparatus for supplementing natural light from solar radiation with light from an artificial light source to compensate for periods of insufficient natural light so as to maintain a desired illumination level within an interior space. The apparatus includes a plurality of artificial light sources and a source of electrical power for the light sources. Switch means is connected between each artificial light source and the power source for selectively energizing the artificial light sources. An actuator means controls the actuation and de-actuation of the switch means so as to control the on-off operation of the light sources respectively. A light sensor means is connected to the actuator means for controlling the actuator means in response to the detection of illumination in the interior area to maintain the desired level of illumination. The actuator means includes a rotatable plate member having a drive means connected to the power source and to the light sensor means for rotating the plate member in response to detection signals from the light sensor means. The switch means includes a plurality of light switches carried in an angularly spaced configuration by the plate member. The light switches are energized in sequence when rotated to a predetermined tilt position by rotation of the plate member by the drive means. A limit switch means is provided for limiting the angular rotation of the plate member within a predetermined angular range so as to prevent the plate member from being further driven rotated during the detection of extreme illumination levels within the interior space.

Accordingly, an important objective of the present invention is to provide an illumination control apparatus for an interior space which efficiently supplements natural light from solar radiation with the minimum amount of light from an artificial light source to maintain a desired illumination level.

Another important object of the present invention is to provide an illumination control apparatus for supplementing light from solar radiation with light from an artificial light source wherein erroneous control of the artificial light source is prevented which can result from detection of erroneous illumination levels.

Yet another important object of the present invention is to provide illumination control apparatus for compensating natural light from solar radiation with light from artificial light sources wherein an efficient rotary switch is provided for controlling the energization of de-activation of the light sources in response to detection of illumination levels at a light sensor.

Still another important object of the present invention is to provide an illumination control apparatus for supplementing natural light from solar radiation with light from an artificial light source only during periods of insufficient levels of solar light so as to conserve electrical energy.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The apparatus of the present invention has application to the control of lighting within an interior space wherein natural light from the sun is supplemented by artificial interior lighting only as is needed to maintain a desired level of illumination. Although the present invention has application with any type of lighting system and interior space, I have chosen a fluorescent lighting system for a business office interior space for illustration of a preferred embodiment.

Figures 1, 2:
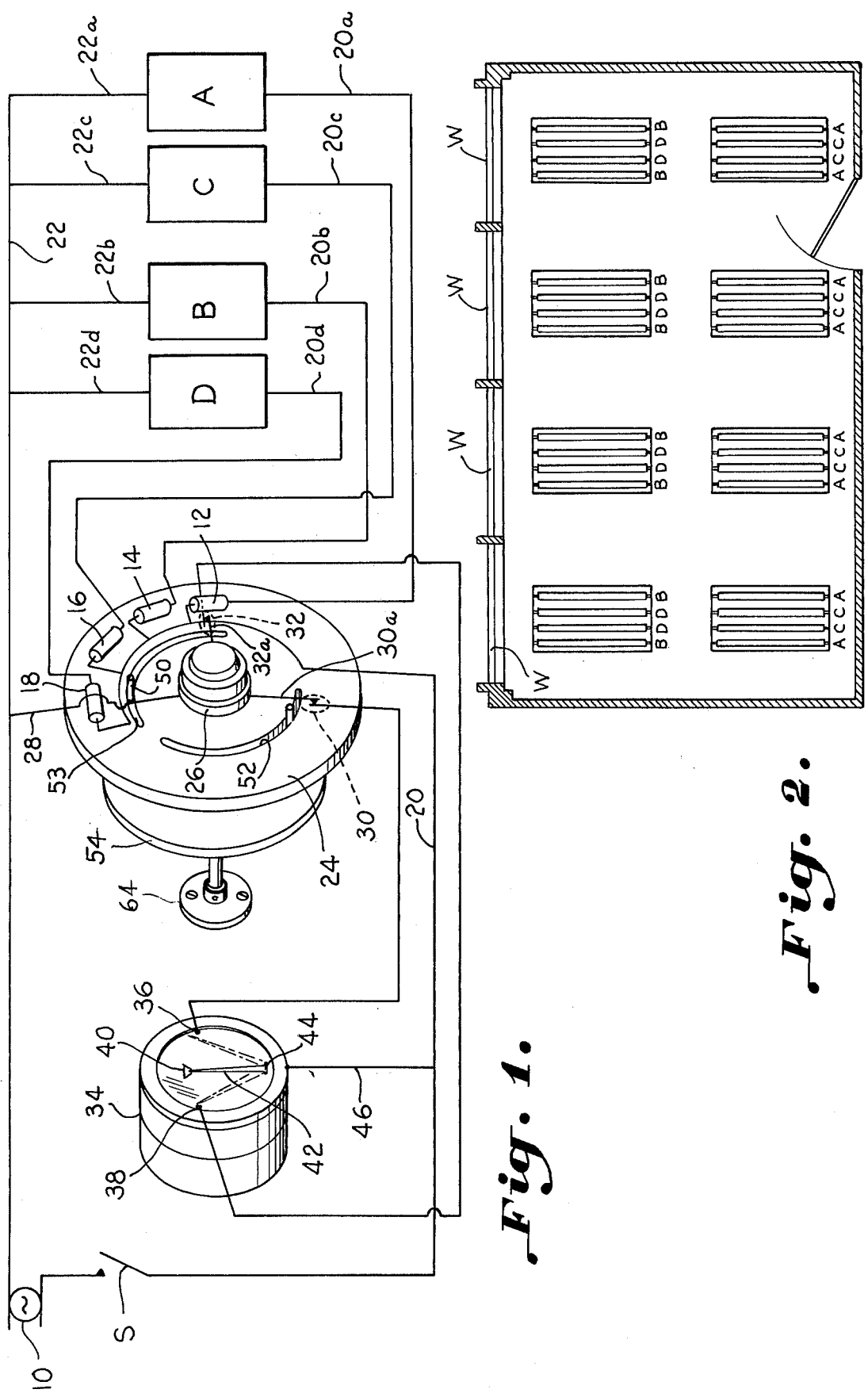
FIG. 1 is a schematic view illustrating an illumination control system constructed in accordance with the present invention.
FIG. 2 is a schematic diagram illustrating a plan view of lighting system for a typical office interior space.

The drawings illustrate a plan view of a typical office space wherein the artificial light source is arranged in loops A through D. The greater the number of loops, the greater the potential saving of electricity. However, installation costs increase slightly with each additional loop. Four loops appear to be practical such as illustrated in FIG. 2 of the drawings. The room is a typical office of approximately 250 square feet, lighted by 32 fluorescent 40 watt tubes operated by a single switch S. The lights cover the room with about 100 foot candles at night and even more during the daytime. Four windows W are located in the outside wall for receiving natural light from solar radiation. The lighting loops are cut on in sequence as controlled by the illumination control apparatus in accordance with the present invention. The first loop that will be cut on will be loop A which consists of two fluorescent tubes in each fixture on the inside wall of a room where lighting will be most likely needed first. The next loop that will be energized in sequence will be loop B which includes two fluorescent tubes in each of the fixtures on the outside wall. The next loop of lighting which will be energized, if additional lighting is necessary, will be loop C which will include the remaining two fluorescent tubes on the inside wall. The last set of lighting loops to be energized, loop D, will be the remaining two fluorescent tubes on the outside wall. As these lighting loops are energized in sequence by the illumination control apparatus of the present invention, a smooth blending of natural from the windows W and artificial light from the flourescent tubes can be had.

Referring now in detail to FIG. 1, an illumination control apparatus is illustrated for supplementing light from solar radiation with light from the artificial light sources in loops A through D. The artificial light is used only to compensate for periods of insufficient natural light so as to maintain a desired illumination level within the office interior space at all times. Each of the artificial light sources A through D is connected to a source of alternating current 10 which provides a source of electrical power for the artificial lights.

A mercury switch 12 is connected between the power source 10 and the artificial light source A. Mercury switch 14 is connected between the power source 10 and the lighting source B. Likewise mercury switches 16 and 18 are connected between the power source 10 and the artificial light sources C and D, respectively. The mercury light switches 12 through 18 provide switch means for selectively energizing the artificial light sources A through D, respectively, in sequence. Each of the mercury switches 12 through 18 is connected to the power source through a common line 20 and to their respective light source loops A through D by means of lines 20a through 20b, respectively. The other end of each lighting loop A through D is connected to the power source 10 by a common line 22 and the individual connecting lines 22a through 22d to complete the electrical circuit.

The mercury switches 12 through 18 are carried on a rotary switch plate member 24 having a drive means 26 which may be a reversible small AC clock motor for rotating the switch plate 24. The rotary switch plate 24 and drive motor 26 provide actuator means for activating and de-activating the mercury switches 12–18. The drive motor 26 is connected on one side to the power source 10 by way of a line 28 connected to the line 22. The other side of the drive motor 26 is connected to the power source 10 by way of a pair of limit switches 30 and 32 through a light sensor means 34. The limit switch 30 is connected to a first pin contact 36 of the light sensor 34. The limit switch 32 is connected to a second electrical pin contact 38 of the light sensor 34.

The light sensor 34 controls the actuator means provided by rotary switch plate 24 and drive motor 26 which in turn controls actuation of mercury switches 12–18. The light sensor has a center position as shown at 40 at which an indicator 42 is positioned when the desired amount of illumination is sensed. The indicator 42 is in the form of an indicator needle which is pivoted about a point 44 having electrical connection with line 20 by way of line 46. The light sensor 34 may be any conventional photo-electric cell or light meter such as used in photographic equipment.

Figure 3:
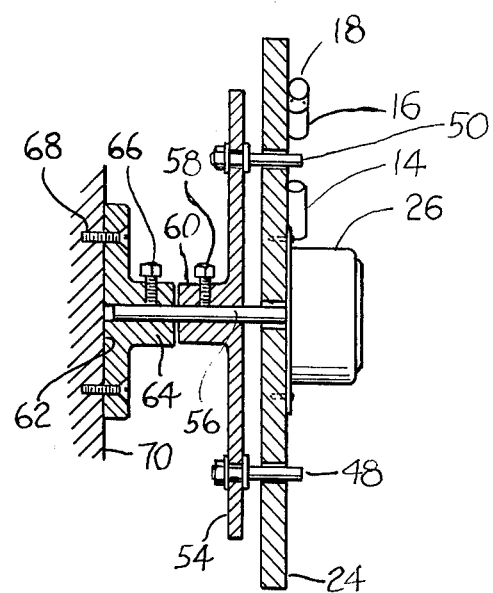
FIG. 3 is a side elevation illustrating illumination control apparatus constructed in accordance with the present invention.

A pair of adjustable abutment pins 48 and 50 are carried adjacent the rotary plate member 24 and extend through a pair of slots 52 and 53, respectively, formed in the plate member. The stationary abutment pin 48 and 50 are carried on a disk 54 which is received over a fixed shaft 56 behind the rotary plate 24 as best shown in FIG. 3. The disk plate 54 is affixed to the shaft 56 by means of a set screw 58 threadably received in a flange collar 60 which is integral with the disk 54. In this manner, the angular positioning of the abutment pins 50 and 48 with respect to the rotary plate 24 and movable switch poles 30a and 32a may be adjusted by rotating the disk 54 on the shaft 56. The housing 26a of the clock motor 26 is affixed to the rotary plate member 24 in any suitable manner such as by screws. The output drive shaft of the motor 26 is actually shaft 56 which is affixed within an opening 62 of a flange 64 by means of a set screw 66. The flange 64 may be suitably attached such as by screws 68 to an interior surface 70. Therefore, as the motor 26 is actuated in either the clockwise or counter-clockwise direction by signals from the light sensor 34, the motor housing 26a will rotate accordingly as will the rotary plate 24 affixed thereto. The drive shaft 56 of the motor of course, will be stationary since it is fixed in the flange 64 causing the motor and housing to rotate.

The limit switches 30 and 32 are carried on the rotary switch plate 24 for rotation therewith and include the pair of movable pole members 30a and 32a, respectively.

The switch pole 30a is aligned with the axis of mercury switch 18 on the switch plate 24 and extends radially in the opposite direction from the center of the plate. The switch pole 32a is aligned with the axis of mercury switch 12 and extends radially toward the switch. Thus, the switch poles 30a and 32a have a fixed angular separation of 90° as carried on the plate 24. The limit switches 30 and 32 may be any movable single pole switch which is tripped open when engaged by abutment pin 48 and 50, respectively, such as a conventional reed switch.

The angular rotation of the rotary plate 24 is limited in the clockwise direction by the movable pole switch 30a which is opened upon engagement with the abutment pin member 48 to break the circuit between the light sensor 34 and the clock motor 26 terminating the rotary movement of the plate 24. Likewise, the angular rotation of the rotary plate 24 is limited in the counter-clockwise direction by engagement of the movable switch pole 32a with the stationary abutment pin 50 which will open the switch pole 32a to break the circuit to the motor 26.

In this manner, the switch plate 24 is prevented from being overdriven due to the detection of erroneous illumination levels within the interior space by the light sensor 34. Such erroneous illumination detection can occur, for example, when light bulbs are burned out and the light sensor 34 senses a need for additional illumination. In such a case, switch plate 24 would be rotated further in a clockwise direction in an attempt to provide more lighting. However, detection of such an illumination condition would continuously overdrive the rotary switch if sufficient illumination capability does not exist due to the burned out light bulbs. Therefore, it is desired to limit the rotation of the switch plate 24 so that it does not rotate any further upon actuation of all of the mercury switches 12 through 18.

Likewise, erroneous illumination levels can be detected such as when a flashlight or other unaccounted for light source is detected by the light sensor 34 and the switch plate 24 is falsely triggered to sequentially cut off the lighting loops A through D. It becomes necessary to limit the counterclockwise direction of the switch plate 24 so that the signal to the drive motor 26 is cut off after the switch plates well passes its angular position corresponding to all of the mercury switches 12 through 18 being cut off. Hence, further detection of such a false illumination level will not continue to overdrive the switch plate.

The mercury switches 12, 14, 16 and 18 are radially spaced from the center of the switch plate 24, as well as being angularly spaced relative to each other. In the preferred embodiment, the four mercury switches 12 through 18 are provided with 30° angular separation therebetween and are radially spaced adjacent the outer periphery of the switch plate.

Figure 4:
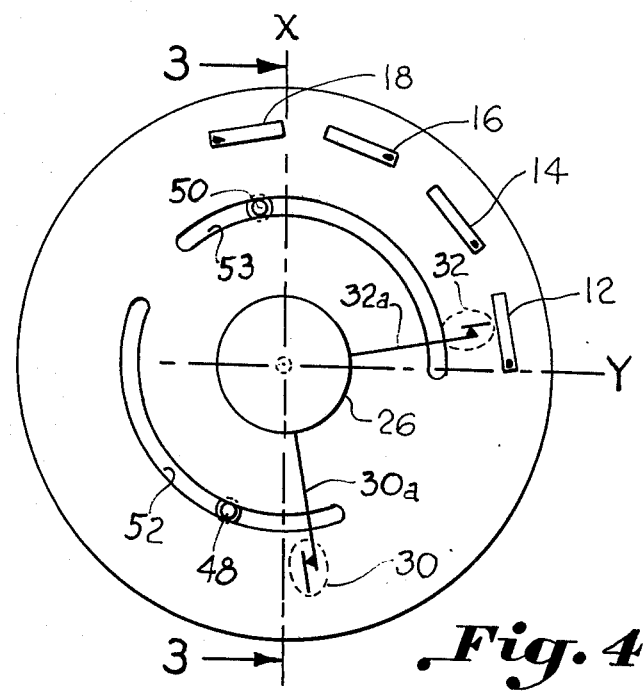
FIG. 4 is a schematic diagram illustrating the operation of an illumination control device constructed in accordance with the present invention.
Figure 5:
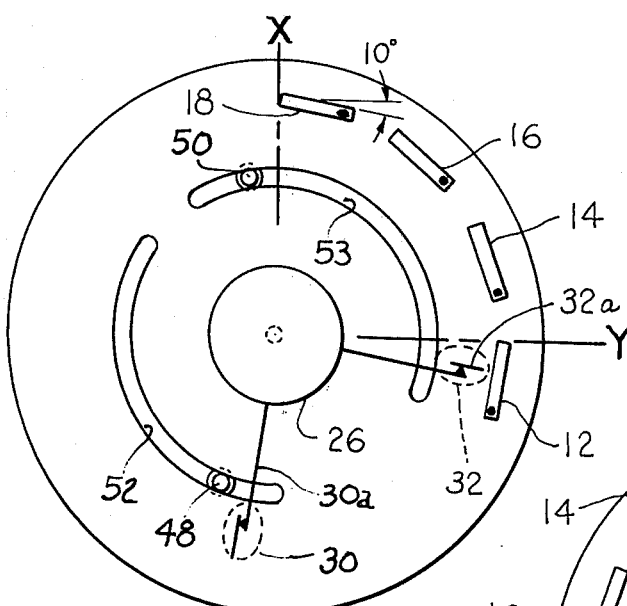
FIG. 5 is a schematic view illustrating an illumination control apparatus constructed in accordance with the present invention wherein all of the light switches are in an on position.

Of course, the number of mercury switches utilized depends on the number of lighting loops necessary for the space being lighted. Any conventional mercury switch may be utilized which normally is actuated when the mercury switch is tilted 10° below the horizontal. One suitable mercury switch is manufactured by the Staley Manufacturing Co. as switch No. 410W. Therefore, as viewed in FIG. 4, mercury switches 12, 14, and 16 are actuated while mercury switch 18 remains in the off position. Upon rotation of the switch plate 24 20° in the clockwise direction, as viewed in FIG. 5, all the mercury switches are now activated.

The movable pole switch 30a is generally aligned with the axis of the mercury switch 18 and the movable pole switch 32a is generally aligned with the axis of the mercury switch 12. In a preferred embodiment, the abutment pin 48 is located approximately 200° from the vertical X axis so that, as viewed in FIG. 5, after all of the mercury switches are activated, the switch plate 24 is allowed to rotate 10° further before limit switch 30 is opened. If the light is still insufficient after all of the lighting loops A–D are energized, further rotation of switch plate 24 would be ineffective and hence further rotation is prohibited.

Figure 6:
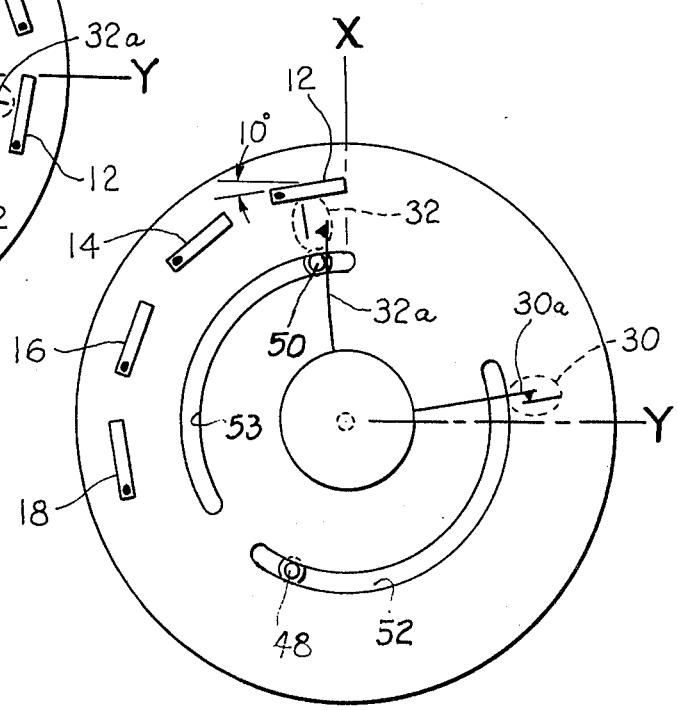
FIG. 6 is a schematic view illustrating an illumination control apparatus constructed in accordance with the present invention wherein all of the lighting switches are in an off position.

FIG. 6 illustrates the angular position of the mercury switches 12 through 18 when all of the switches are in an off condition. In this condition, all of the mercury switches shown are tilted with the reverse end of the switch downward so that the mercury inside the switch does not close the contacts. The mercury switch 12 will cut off when in a horizontal position. Thus, all of the switches are de-activated and the artificial light sources D through A are de-energized. Of course, any angular position of the mercury switches 12 through 18 which is intermediate the positions shown in FIGS. 5 and 6 will result in certain of the mercury switches being in an activated position and certain of the switches being de-activated. This depends on whether or not the mercury switches are tilted down after the switch has been at an angle of 10° or more below the horizontal with their forward end tilted downwardly.

The abutment pin 50 is located approximately minus 10° from the vertical X-axis. Switch plate 24 is allowed to rotate an additional 10° after the last mercury switch 12 is off or in a horizontal position before limit switch 32 is opened. As shown in FIG. 6, switch 12 had already been rotated 10° past the off position and switches pole 32a abuts the abutment 50 wherein further counter-clockwise rotation will open switch 32. Thus, switch plate 24 is limited to a predetermined angular range of rotation of 120° as the adjustable abutment pins 48 and 50 are shown positioned.

In operation, should the natural light from solar radiation be insufficient to provide a desired level of illumination within the interior space, the indicator 42 of the light sensor 34 will move to the contact 36 which will send a signal to the drive motor 26. This signal will cause the switch plate 24 to rotate clockwise so as to activate additional mercury switches and cause additional lighting loops A through D to be sequentially energized until the indicator 40 is brought back to its generally central position 40 indicating the desired amount of illumination has been achieved.

If the natural light from the sun increases during the day the increase in illumination will be detected by the light sensor 34 whereupon the indicator 42 will move to the excess light position and engage contact 38. This will cause a circuit to be completed from the power source 10 through line 46, contact 38, to the drive motor 26 causing the switch plate 24 to rotate in a counter-clockwise direction. The counter-clockwise rotation of the switch plate 24 will cause the mercury switches 18 through 12 to be de-activated in sequence until the desired amount of illumination is achieved causing the indicator 42 to return to its central position. In this manner, the optimum blending of artificial light with natural light from the sun is achieved so as to supplement natural light only when necessary to maintain the desired level of illumination.

The apparatus of the present invention provides an efficient control of a lighting system having very fine control and little actual notice of changing light conditions while at the same time providing great savings in electrical energy.

The drive motor 26 for the switch plate 24 operates at a very slow speed so that several seconds lapse between the activation of each mercury switch and artificial lighting loops to allow ample time to prevent activation of two many lighting loops and turning lighting loops off and on for short time variations in light, such as when lightning might possible flash or when flare from a match might occur.

While a preferred embodiment of the invention has been described using specific terms, such description is for illustrative purposes only, and it is to be understood that changes and variations may be made without departing from the spirit or scope of the following claims.

What is claimed is:

1. Illumination control apparatus for supplementing light from solar radiation with light from an artificial light source to compensate for periods of insufficient levels of solar light to maintain a desired illumination level within an interior space comprising:
    (a) a plurality of artificial light sources connected to an electrical power source;
    (b) switch means connected between each said artificial light source and said power source for selectively energizing said light sources;
    (c) movable actuator means operatively connected to said switch means for sequentially actuating and deactuating said switch means and controlling the on-off operation thereof;
    (d) reversible motorized drive means connected to said power source and operatively connected to said actuator means for effecting movement thereof so as to cause sequential actuation of said switch means when said actuator is moved in one direction and sequential deactuation when said actuator means is moved in a reverse direction;
    (e) light sensor means connected between said power source and said reversible drive means for detecting the illumination level of said interior space and controlling the operation of said drive means and the movement of said actuator means in response to said illumination level so that said switch means selectively controls said artificial light sources to maintain said desired illumination level over said interior space in combination with said solar light,
    (f) limit means carried adjacent said actuator means for limiting the operation of said actuator means within a predetermined range of movement so as to prevent further movement thereof under detection of erroneous illumination levels; and
    (g) said limit means including electrical limit switch means connected between said power source and said drive means being opened in response to movement of said actuator means outside said predetermined range of movement to denergize said drive means.

2. The apparatus of claim 1 wherein said actuator means includes a rotary element with said switch means carried thereon.

3. The apparatus of claim 2 wherein said switch means comprises a mercury switch activated when rotated to a predetermined tilt position by rotation of said rotary element.

4. The apparatus of claim 3 wherein said limit means includes:
    (a) said electrical limit switch means connected between said light sensor means and said drive means having a movable switch pole carried for rotation with said rotary element, and
    (b) stationary abutment means carried adjacent said rotary element for engaging said switch pole when said rotary element exceeds a predetermined angular rotation to open said limit switch means preventing further movement of said rotary element.

5. The apparatus of claim 2 including a plurality of said artificial light sources wherein said switch means includes a mercury switch connected between each said light source and said power souce, said mercury switches being carried on said rotary element in an angularly spaced configuration so as to be sequentially actuated when rotated to a predetermined tilt position.

6. The appratus of claim 1 wherein said light sensor means includes:
    (a) a light meter having an indicator having a normal center position corresponding to said desired illumination level;
    (b) a first electrical contact spaced from one side of said center position;
    (c) a second electrical contact spaced on the opposite side of said center position; and
    (d) said indicator moving to engage said first contact when an insufficient illumination level is sensed in said interior space, and said indicator moving to engage said second contact when an excess level of illumination is detected.

7. The apparatus of claim 6 wherein said actuator means is moved to energize said switch means when said indicator engages said first contact, said actuator being moved in an opposite direction to de-energize said switch means when said indicator engages said second contact.

8. Illumination control apparatus for supplementing light from solar radiation with light from a plurality of artificial light sources to compensate for periods of insufficient solar light so as to maintain a desired illumination level within an interior space of the type including switch means connected between said artificial light source and a power source for selectively energizing said artificial light sources; actuator means operatively connected to said switch means for controlling the actuation and de-actuation of said switch means so as to control the on-off operation of the light sources respectively, and light sensor means connected to said actuator means for controlling the operation of said actuator means and hence said switch means in response to the detection of illumination in said area to maintain the desired level of illumination; wherein the improvement comprises:
    (a) said actuator means including a rotating actuator plate member having a reversible rotary drive means connected to said power source for rotating said plate member when energized;
    (b) said light sensor means being connected between said rotary drive means and said power source for controlling the energization of said drive means and rotation of said actuator plate member in response to said illumination level;
    (c) said switch means includes an individual light switch connected between each said artificial light source and said power source carried in an angularly spaced configuration of said plate member;
    (d) said light sensor means energizing said drive means to effect rotation of said actuator plate member in one direction in response to the detection of a low level of illumination and in a reverse direction in response to a high level of illumination while terminating rotating in response to the detection of said desired level of illumination; and
    (e) said light switches being sequentially actuated and deactuated as said actuator plate rotates in said one and reverse directions, respectively, to blend said solar and artificial light and maintain the desired level of illumination in said interior space.

9. The apparatus of claim 8 further comprising limit switch means connected between said power source and said rotary drive means for limiting the angular rotation of said plate member, said limit switch being opened in response to movement of said actuator plate member outside of a predetermined angular range so as to prevent said plate member from being further rotated under the detection of erroneous illumination levels within said interior space.

10. The apparatus of claim 9 wherein said limit switch means includes:
 (a) a movable switch pole member carried for rotation with said rotary plate member; and
 (b) stationary abutment means carried adjacent said plate member for engagement with said switch pole upon rotation of said plate member past said predetermined angular range to open said limit switch preventing further movement of said rotary plate member.

11. The apparatus of claim 8 wherein said light switches comprise mercury switches.

* * * * *